Figure 1:
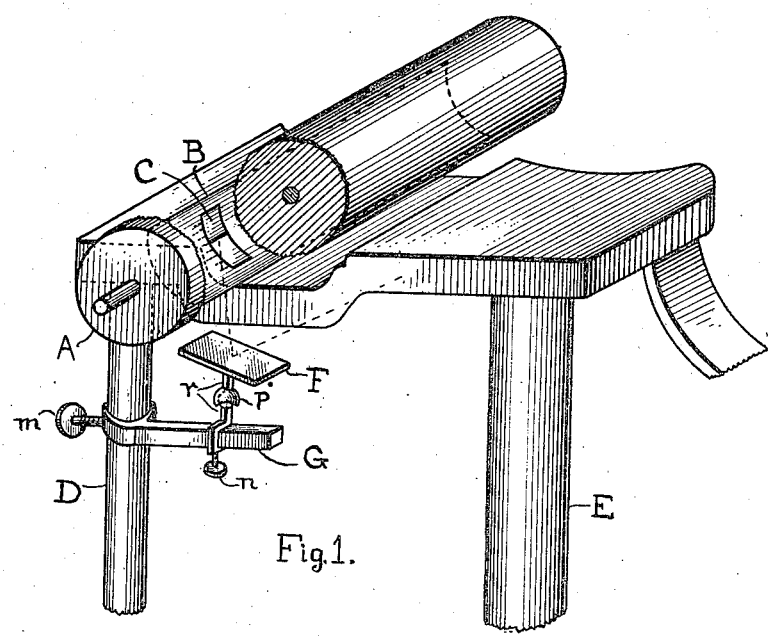

R. H. MILLWARD.
ATTACHMENT FOR TYPE WRITERS.
APPLICATION FILED MAR. 26, 1910.

1,045,424.

Patented Nov. 26, 1912.

Russell Hastings Millward.
Inventor

Witnesses

UNITED STATES PATENT OFFICE.

RUSSELL HASTINGS MILLWARD, OF WASHINGTON, DISTRICT OF COLUMBIA.

ATTACHMENT FOR TYPE-WRITERS.

1,045,424.  Specification of Letters Patent.  Patented Nov. 26, 1912.

Application filed March 26, 1910. Serial No. 551,624.

*To all whom it may concern:*

Be it known that I, RUSSELL HASTINGS MILLWARD, a citizen of the United States, residing at the Kenesaw, Washington, District of Columbia, have invented a new and useful Attachment for Type-Writers, of which the following is a specification.

My invention relates to an attachment for typewriters, and its function is to indicate the amount of margin at the bottom of the sheet of paper.

Briefly it consists of a scale or member located adjacent the platen and a mirror or reflecting device to receive reflections from said member and platen.

The invention is more particularly pointed out in detail description and the accompanying drawings which are to be considered as illustrative and not in a restrictive sense.

Like characters are used to designate corresponding parts in the description and on the drawing.

Figure 2:
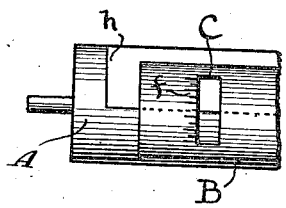
Figure 3:
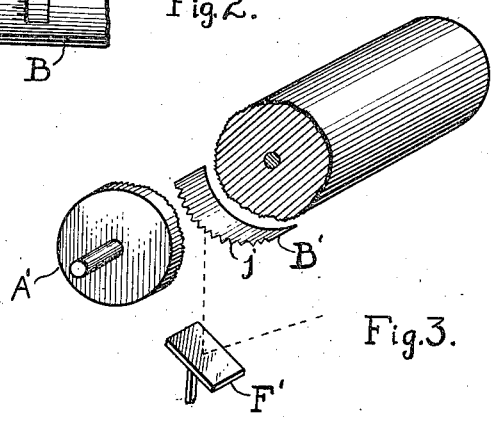

Figure 1 is a perspective view of a portion of a typewriter with the device applied thereto. Fig. 2 is a bottom plan view showing the relation of the scale to the platen. Fig. 3 is a modified form showing the platen, scale and mirror in perspective.

Referring to Fig. 1—"A" represents the platen of a typewriter, "D" and "E" the standards or legs thereof, "B" a shield or member which is concentric with the platen and moves longitudinally therewith, being secured to the typewriter carriage. A slot is cut in the shield B, and as the paper is between the shield and the platen, it may be viewed through said slot. On the under side of the shield divisional marks of any convenient length may be placed along one edge of the slot. A scale is thus formed which is designed to indicate the amount of margin at the bottom of the sheet of paper. A mirror or reflecting device "F" is so located as to receive reflections from said slot. The mirror may be secured to any convenient part of the typewriter and in any suitable manner. In the embodiment shown, an arm or support "G" having a clamp at one end thereof is secured to the leg "D". The arm "G" is vertically adjustable on the leg "D", and a set screw "m" holds the arm "G" in place. The mirror "F" has a depending arm "r" which has a clamp at the lower end thereof for securing the arm to the support "G". The set screw "n" holds the arm "r" in secure adjustment. As is evident the mirror may be moved along the support "G". Arm "r" has a ball and socket joint "p" whereby the mirror may be turned in any desired position.

In Fig. 2 the relation of the paper "h" to the slot is shown, "f" being the divisional marks.

It is not necessary that the scale be movable or be made in the form of a shield for the platen. A member constituting a scale may be attached to any suitable part of the typewriter so as to be adjacent the path of travel of the platen. A mirror is then placed so as to receive reflections of the scale and platen. In Fig. 3 is shown the necessary arrangement of parts so that this relation can exist. The scale B' in this case has serrations "j" which are the equivalent of divisional marks. A' is the platen and F' is the reflecting device which may be a polished piece of metal if desired. A stationary member having a slot cut therein may also be used as the scale device.

Having described my invention, what I desire to claim is:

In combination with a typewriting machine and its frame, a reflector projecting from and beyond one side of the machine in position to reflect the platen roller when it extends beyond the side of the machine, means to detachably connect said reflector to said frame of the machine, and means to adjust the reflector angularly in a vertical plane relatively to the platen to obtain the angle of reflection.

RUSSELL HASTINGS MILLWARD.

Witnesses:
 CLARENCE WEAVER,
 GEO. S. LIVINGSTON.